US009922080B2

(12) United States Patent
Chen et al.

(10) Patent No.: US 9,922,080 B2
(45) Date of Patent: Mar. 20, 2018

(54) QUERY PLAN DETERMINATION

(71) Applicant: Hewlett-Packard Development Company, L.P., Houston, TX (US)

(72) Inventors: Qifan Chen, Austin, TX (US); Hao Qin, Shanghai (CN); Taoufik Ben Abdellatif, Austin, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 321 days.

(21) Appl. No.: 14/736,504

(22) Filed: Jun. 11, 2015

(65) Prior Publication Data
US 2016/0364447 A1  Dec. 15, 2016

(51) Int. Cl.
*G06F 17/30* (2006.01)
(52) U.S. Cl.
CPC .............. *G06F 17/30442* (2013.01)
(58) Field of Classification Search
CPC ......... G06F 17/30442; G06F 17/30463; G06F 17/3033; G06F 17/30466; G06F 17/30475; G06F 17/277; G06F 17/30457
USPC ....... 707/713, 714, 716, 717, 718, 719, 720, 707/721
See application file for complete search history.

(56) References Cited

U.S. PATENT DOCUMENTS

| 7,010,524 B2 | 3/2006 | Galindo-Legaria et al. |
| 8,224,806 B2 | 7/2012 | Al-omari et al. |
| 8,266,281 B1 * | 9/2012 | Carlson ............... G06F 11/3419 709/203 |
| 8,874,547 B2 | 10/2014 | Khanolkar et al. |
| 2008/0313131 A1 * | 12/2008 | Friedman .......... G06F 17/30463 |
| 2011/0029508 A1 * | 2/2011 | Al-Omari ......... G06F 17/30433 707/718 |
| 2012/0130986 A1 * | 5/2012 | Abdellatif ........ G06F 17/30463 707/718 |
| 2014/0012882 A1 | 1/2014 | Poppitz |

OTHER PUBLICATIONS

Zhang H. et al., "On Complexity and Optimization of Expensive Queries in Complex Event Processing, Proceedings of the 2014 ACM SIGMOD international conference on Management of data," (Research Paper), 2014, pp. 217-228.

* cited by examiner

*Primary Examiner* — Greta L Robinson
(74) *Attorney, Agent, or Firm* — Hewlett Packard Enterprise Patent Department

(57) ABSTRACT

In one example in accordance with the present disclosure, a method for determining query plans includes obtaining a current query and generating a first literal and a first signature key from the current query. The method includes determining that the first signature key matches a second signature key stored in a parser cache and obtaining a literals data structure corresponding to the second signature key. The literals data structure comprises a group of literals, a list of high and low boundary intervals and a parameterization indicator. The method includes identifying, using the parameterization indicator, a parameterized literal in the group of literals. The method includes determining that a high and low boundary interval for the second parameterized literal contains the first literal and executing a stored query plan on the current query.

14 Claims, 6 Drawing Sheets

QUERY PLAN DETERMINATION

BACKGROUND

Query compilers, such as a Structured Query Language (SQL) compiler, are expected to deliver high performance query plan optimizations for a variety of workloads with different requirements. For example, an online transaction processing (OLTP) query typically runs under transactional protection and fetches or updates a few rows in a transactional database. An operation data store (ODS) query, on the other hand, may be ad-hoc and complex in nature and performs joins or aggregates while accessing a medium to large amount of data in an operational database. Delivering competitive performance for various workloads may require a query compiler to generate optimized query plans using the least amount of compile time.

BRIEF DESCRIPTION OF THE DRAWINGS

The following detailed description references the drawings, wherein.

DETAILED DESCRIPTION

Figure 1:
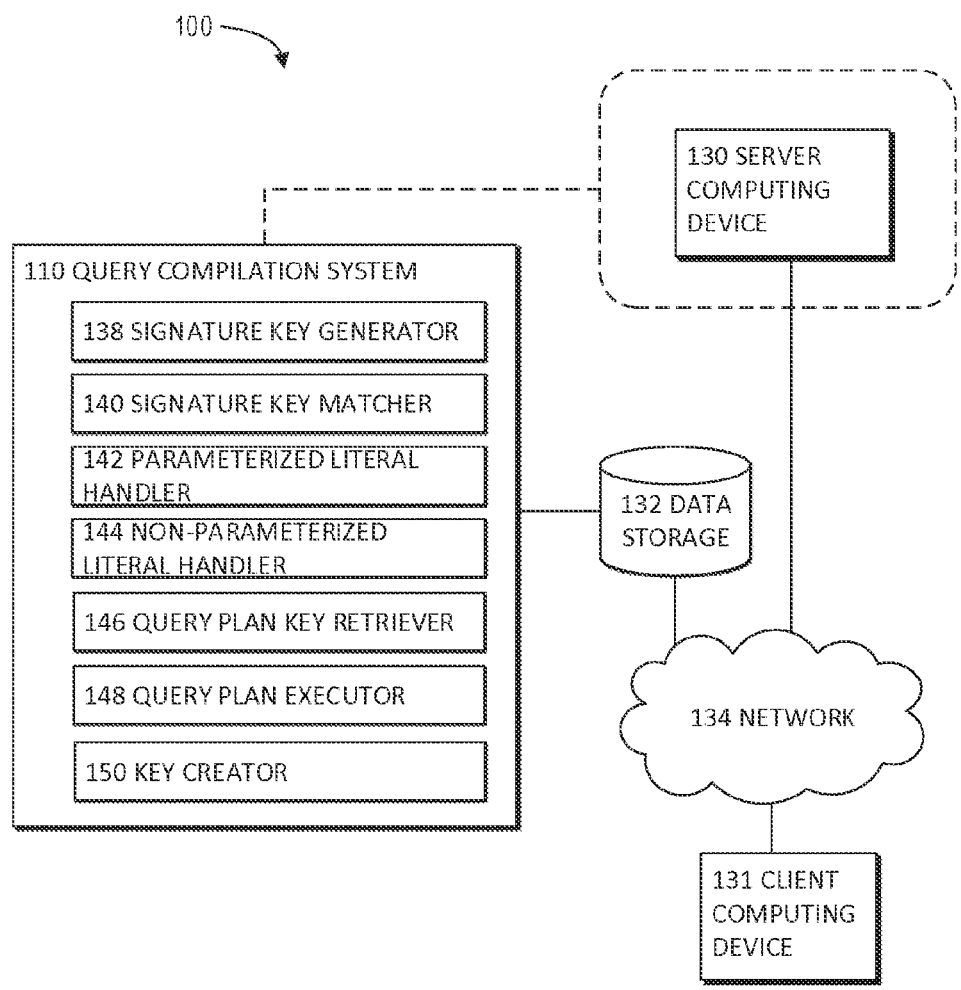
FIG. 1 is a block diagram of an example computing environment in query plan determination may be useful.

Techniques to reduce the compilation time for structurally similar queries often perform a search of a similarity cache key from the query against a cache called the similarity cache at the end of the binding stage. The binding stage, however, is relatively heavy in computation due to the need to resolve object references and to transform the query into a more suitable internal representation. When the expected execution time per query is very small, such as in seconds or less, these techniques may become a limiting factor because the binding stage can take milliseconds or even seconds to finish.

Example query plan determination systems discussed herein can determine a query plan very quickly while still retaining a high accuracy of results. The system may be implemented by a compiler. The example query plan determination system may parse a current query into the structure of the query and the values used in the current query. The example query plan determination system can determine the structural similarity very quickly by computing and comparing the signatures of a current query and a previous query in the parser. Specifically, the example query plan determination system may generate a signature corresponding to the structure of the current query and collect the literals corresponding to the values contained in the current query. The signature is the sequence of tokens into which the current query is parsed. Because the signature may be used to uniquely identify a class of structurally similar queries, the signature may also be used as a signature key. The example query plan determination system may verify the structural similarity of two queries very quickly if the example query plan determination system computes and compares the signatures in the parser. Parsing the query in the parser is the first step of compilation.

Moreover, the example query plan determination system maintains a high accuracy by matching a parameterized literal, or literal used in a parameterizable predicate, of a current query to an interval of a statistical histogram associated with the compilation of a previous query. An example of a parameterizable predicate is an equality predicate in the form of "column_name=literal." The statistical histogram captures the data distribution in some column referenced in a predicate with a list of intervals, each interval defined by a low bound, a high bound, a row count, and/or a unique entry count. The low bound is the lowest value in the interval, the high bound is the highest value in the interval, the row count is how many rows are in the entry and the unique entry count is the number of unique entries in the interval.

Structurally similar queries with identical histogram intervals for each and every parameterized literal form an equivalent class of queries (EQ). Each query in the equivalent class of queries contains identical histogram intervals for each parameterized literal from the database and every query in an EQ compiles into the same query plan. Accordingly, if both the signature key and the literals of a current query match the signature key and statistical histogram levels of a previous query stored in a cache, such as a parser cache, the query plan for the previous query may be retrieved and used on the current query. By reusing query plans in this manner, the example query plan determination system does not have to go through other more computationally expensive steps to create new query plans and can complete the compilation more quickly, while still maintaining accuracy.

The example query plan determination system may include a cache memory with a hash table containing information regarding previous queries, such as signature key, a literals data structure and a query plan. The signature key uniquely identifies a subset of entries in the hash table and each entry in the hash table represents an EQ. Each entry in the hash table has an associated literals data structure including a tuple $\{l, b, m, s\}$ where: l is the list of literals in the query, b is the list of low and high boundary pairs, m is the list of parameterization indicators, and s is a query plan key used for fetching query plans. If a literal in l is parameterized, the histogram interval boundaries of the literal are stored in b. If a literal has been flagged as parameterized or non-parameterized, the corresponding parameterization indicator is stored in m.

The signature key generated from a current query may be compared to the entries in the hash table corresponding to previous queries. If the signature key for the current query does not match any signature keys in the hash table, the system may attempt to create a new entry in the hash table. If a signature key match is found, the system may then perform a similarity test by determining whether any parameterized literal collected from the current query is contained in the corresponding boundary pair for a previous query in the hash table. When this equivalent class test passes and any non-parameterized literals in the current query and the previous query match exactly, the query plan key is used to find the query plan for the previous query. The query plan for the previous query is used for the current query and the compilation of the current query finishes at this point. If the similarity test does not match and/or each non-parameterized literal in the current query and the previous query do not match exactly, the system may test another entry in the hash table. The number of possible EQ classes for a given signature key may also be limited in order to minimize the search time.

FIG. 1 is an example environment 100 in which various examples may be implemented as a query compilation system 110. Environment 100 may include various components including a server computing device 130, a client computing device 131 and a data storage 132. The client computing device 131 may communicate requests to and/or receive responses from the server computing device 130. The server computing device 130 may communicate requests to and/or receive responses from the data storage 132. The server computing device 130 may receive and/or respond to requests from the client computing device 131. The client computing device 131 may be any type of computing device providing a user interface through which a user can interact with a software application. For example, the client computing device 131 may include a laptop computing device, a desktop computing device, an all-in-one computing device, a tablet computing device, a mobile phone, and/or other electronic device suitable for displaying a user interface and processing user interactions with the displayed interface. While the server computing device 130 is depicted as a single computing device, the server computing device 130 may include any number of integrated or distributed computing devices serving at least one software application for consumption by the client computing device 131.

The various components (e.g., components 130, 131, and/or 132) depicted in FIG. 1 may be coupled to at least one other component via a network 134. Network 134 may comprise any infrastructure or combination of infrastructures that enable electronic communication between the components. For example, the network 134 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, query compilation system 110 and the various components described herein may be implemented in hardware and/or a combination of hardware and programming that configures hardware. Furthermore, in FIG. 1 and other Figures described herein, different numbers of components or entities than depicted may be used.

Query compilation system 110 may comprise various components, including a signature key generator 138, a signature key matcher 140, a parameterized literal handler 142, a non-parameterized literal handler 144, a query plan key retriever 146, a query plan executor 148, a key creator 150, and/or other components. The components of the query compilation system 110 as described herein, may refer to hardware or a combination of hardware and instructions that performs a designated function. As is illustrated with respect to FIG. 5, the hardware of the various components of query compilation system 110, for example, may include one or both of a processor and a machine-readable storage medium. The instructions may be code stored on the machine-readable storage medium and executable by the processor to perform the designated function.

Signature Key Generator 138 may obtain a current query originating from, for example, the client computing device 131. An example current query may look something like what is shown in Table 1 below.

TABLE 1

SELECT A, B from T where A = 5;

Signature Key Generator 138 may further parse the current query to generate a signature and collect literals. The signature describes the structure of the current query and is the sequence of tokens into which the query is parsed. The generated signature becomes a signature key for the query compilation system 110 as it uniquely identifies a class of structurally similar queries. In other words, the signature key corresponds to the structure of the current query and the literals correspond to fixed data values used in the structure. An example signature key and literal may look something like what is shown in Table 2 below.

TABLE 2

Signature Key: SELECT A, B from T where A = ?
Literal: 5

Signature Key Matcher 140 may obtain the signature key generated by Signature Key Generator 138 and compare it to one or more signature keys retrieved from a cache, such as a parser cache. The signature keys stored in the cache identify previous queries that have already been parsed into signature keys and literals and cached for future use. Because the signature key uniquely identifies a class of structurally similar queries, Signature Key Matcher 140 verifies the structural similarity of the two queries.

The cache may include a hash table T. For each query p, the signature key uniquely identifies a subset of entries in hash table T. Each entry in the hash table T is a tuple {l, b, m, s}, where l is a list of literals in the query p, b is a list of low and high boundary pairs (or intervals), m is a list of parameterization indicators and s is a query plan key corresponding to a query plan for executing the query p. As described above, if the signature key and the literals of a current query matches an entry in the cache, the query plan associated with the entry can be retrieved and applied to the current query.

Parameterized literal handler 142 determines if each parameterized literal collected from the current query passes the similarity test. A "parameterized" literal is a literal that is used in a parameterized predicate of a current query. Parameterized literal handler 142 may determine if a given literal is a parameterized literal based on the predicate and/or function in which the literal appears. An example of a parameterizable predicate is an equality predicate in the form of "column_name=literal." For example, the example current query shown in Table 1 contains an equality predicate, A=5. The column name is A and the literal, 5, collected from the current query is flagged as a parameterized literal.

As described above, each query p in the hash table T includes a list of literals in the query and a list of high and low boundary pairs. To determine if each parameterized literal in the current query passes the similarity test, the parameterized literal handler 142 may determine if each literal in the current query falls within the range defined by the low and high boundary pairs of the interval. An example set of low and high boundary pairs may look something like what is shown in Table 3 below.

TABLE 3

Interval 1: [0, 100]
Interval 2: [101, 200]

Referring again to the example discussed above in reference to Tables 1 and 2 above, the literal 5, collected from the example current query falls within Interval 1 and thus would pass the similarity test.

Non-Parameterized literal handler 144 determines if each non-parameterized literal collected from the current query matches each non-parameterized literal collected from the previous query in the cache. A "non-parameterized" literal is a literal that is used in a non-parameterizable predicate of a current query. Parameterized literal handler 142 may determine if a given literal is a parameterized literal based on the predicate and/or function in which the literal appears. An example of a literal that is not parameterized in a predicate of a current query may look something like what is shown in Table 4 below.

TABLE 4

SELECT A, B from T where SQRT(B) = 8

The example current query shown in Table 4 contains a SQRT function which is a non-parameterizable predicate and thus the literal, 8, used in the current query is flagged as a non-parameterized literal. To determine if each non-parameterized literal in the current query matches each non-parameterized literal collected from the previous query in the cache, non-Parameterized literal handler 144 may determine if each non-parameterized literal in the current query matches each non-parameterized literal in the previous query in the cache.

Query Plan Key Retriever 146 retrieves a query plan key for the previous query in the cache that may be used to retrieve a query plan for execution on the current query.

Query Plan Executor 148 retrieves, using the query plan key, the query plan created for the previous query and executes the query plan on the current query.

Key Creator 150 creates and inserts a new entry into the hash table in the parser cache when the query is found to be parser cache cacheable and selectivity cache cacheable and when its equivalent class query (EQ) is not in the hash table. To insert a new entry, key creator 150 prepares the literals data structure, {l, b, m, s}, described above. Key Creator 150 collects literals and adds them to the list l. For each literal in l, key creator 150 decides whether the literal should be parameterized depending on the predicate/function in which it appears. For example, literals contained in equality predicates may be parameterized and literals contained in other functions may not be parameterized. For a parameterized literal, a statistical histogram is identified, and the low and high boundaries of the corresponding interval may be appended to b. The parameterization indicator, identifying any parameterized and/or non-parameterized literals, may be stored in m. Finally, the query plan key s is recorded.

Figure 2:
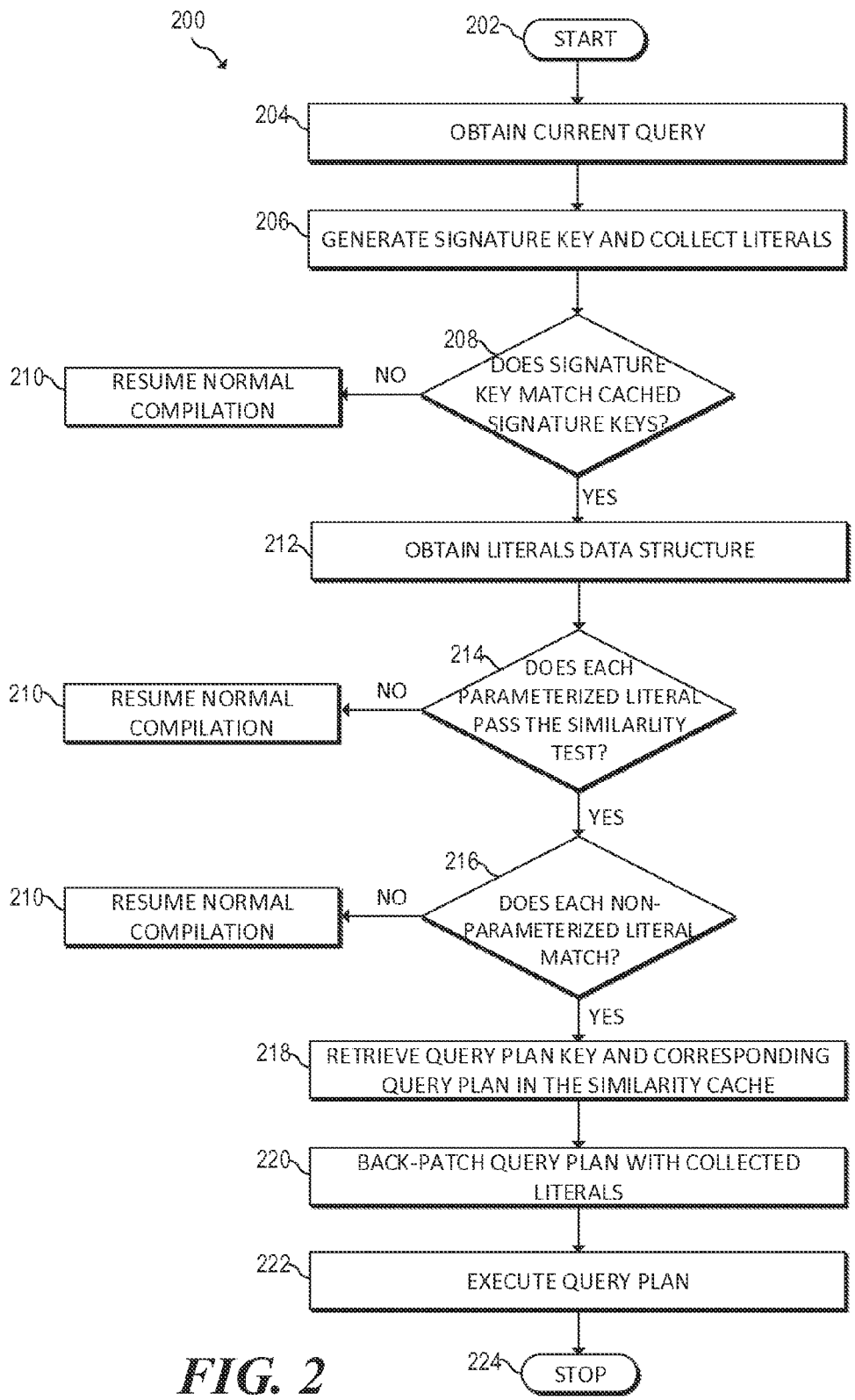
FIG. 2 is a flowchart of an example method for query plan determination.

FIG. 2 is a flowchart of an example method 200 for query plan determination. Method 200 may be described below as being executed or performed by a system, for example, system 110 of FIG. 1, system 500 of FIG. 5 or system 600 of FIG. 6. Other suitable systems and/or computing devices may be used as well. Method 200 may be implemented in the form of executable instructions stored on at least one machine-readable storage medium of the system and executed by at least one processor of the system. Alternatively or in addition, method 200 may be implemented in the form of electronic circuitry (e.g., hardware). In alternate embodiments of the present disclosure, one or more steps of method 200 may be executed substantially concurrently or in a different order than shown in FIG. 2. In alternate embodiments of the present disclosure, method 200 may include more or less steps than are shown in FIG. 2. In some embodiments, one or more of the steps of method 200 may, at certain times, be ongoing and/or may repeat.

Method 200 may start at step 202 and continue to step 204, where the system may obtain a current query. The current query may contain references to tables, columns, predicates and functions, including parameterizable functions and non-parameterizable functions. At step 206, the system may generate a signature key and collect literals from the current query. The signature key may be a sequence of tokens corresponding to the structure of the current query. The system may generate the signature key and collect the literals from the current query during the parsing state of a query compilation. In one example, the system parses the current query into a parameterized literal used in a parameterizable predicate and/or non-parameterized literals used in non-parameterizable predicates or functions.

At step 208, the system may determine that the signature key generated from the current query matches a signature key stored in a cache, such as the parser cache. Each cached signature key comprises a sequence of tokens corresponding to the structure of a previous query. The cache may comprise a hash table with the cached signature keys and each cached signature key may also be associated with a corresponding literals data structure. If the signature key generated from the current query does not match a cached signature key stored in the cache (NO branch of step 208), the method 200 may continue to step 210, where method 200 may resume normal compilation of the query. The system may attempt to match the signature key to a number of signature keys in the parser cache. In one example, the method may attempt to add the signature generated from the current query to the cache. This is explained in further detail below in reference to FIG. 3.

If the signature key generated from the current query does match a signature key (YES branch of step 208), at step 212, the system may obtain a literals data structure corresponding to the cached signature key. The literals data structure may comprise a group of literals, a list of high and low boundary intervals, a query plan key and/or a parameterization indicator. The high and low boundary intervals may also be a representation of a statistical histogram. A statistical histogram may exist for each parameterized literal in the group of literals, each statistical histogram comprising a list of intervals defined by a low bound and a high bound, a row count and a unique entry count. The low bound is the lowest value in the interval, the high bound is the highest value in the interval, the row count is how many rows are in the interval and the unique entry count is the number of unique entries in the interval. The system may use the parameterization indicator to determine if the literals in the group of literals are parameterized or non-parameterized. The parameterized literals may be used in parameterizable functions corresponding to the cached query key and the non-parameterized literals may not be used in parameterizable functions corresponding to the cached query key, but instead used in non-parameterizable functions.

The system may also expand the interval boundaries by determining a density for each of the first and second interval, wherein the density is derived by dividing the row count by the unique entry count. If the system determines that the densities are equal, then the system may combine the first interval and the second interval.

At step 214, the system may determine if each parameterized literal from the current query passes the similarity test. As described above, the similarity test includes determining if each parameterized literal in the current query falls within the range defined by the low and high boundary pairs of the interval from the literals data structure corresponding to the cached signature key. The high and low boundary pairs may also be part of the statistical histogram. If each parameterized literal does not pass the similarity test (NO branch of step 214), the method 200 may continue to step 210, where method 200 may resume normal compilation of the query. The system may also select a different matching cached signature key and determine whether each parameterized literal passes the similarity test. The system may also attempt to add the signature generated from the current query to a parser cache. This is explained in further detail below in reference to FIG. 3.

If each parameterized literal does pass the similarity test, the method 200 may continue to step 216, where the system may determine if each non-parameterized literal collected from the current query matches each non-parameterized literal from the literals data structure corresponding to the cached signature key. If each non-parameterized literal does not match (NO branch of step 216), the method 200 may continue to step 210, where method 200 may resume normal compilation of the query. The system may also select a different matching cached signature key and determine whether each parameterized literal passes the similarity test and each non-parameterized literal matches. The system may also attempt to add the signature generated from the current query to the parser cache. This is explained in further detail below in reference to FIG. 3.

If each non-parameterized literal does match (YES branch of step 216), the method 200 may continue to step 218, where the system may retrieve the query plan key from the literals data structure and may use the query plan key to obtain the query plan corresponding to the cached signature key in the similarity cache. At step 220, the system may back-patch the query plan with the literals collected from the current query and at step 222, the system may execute the query plan. The method may continue to step 224, where method 200 may stop.

Figure 3:
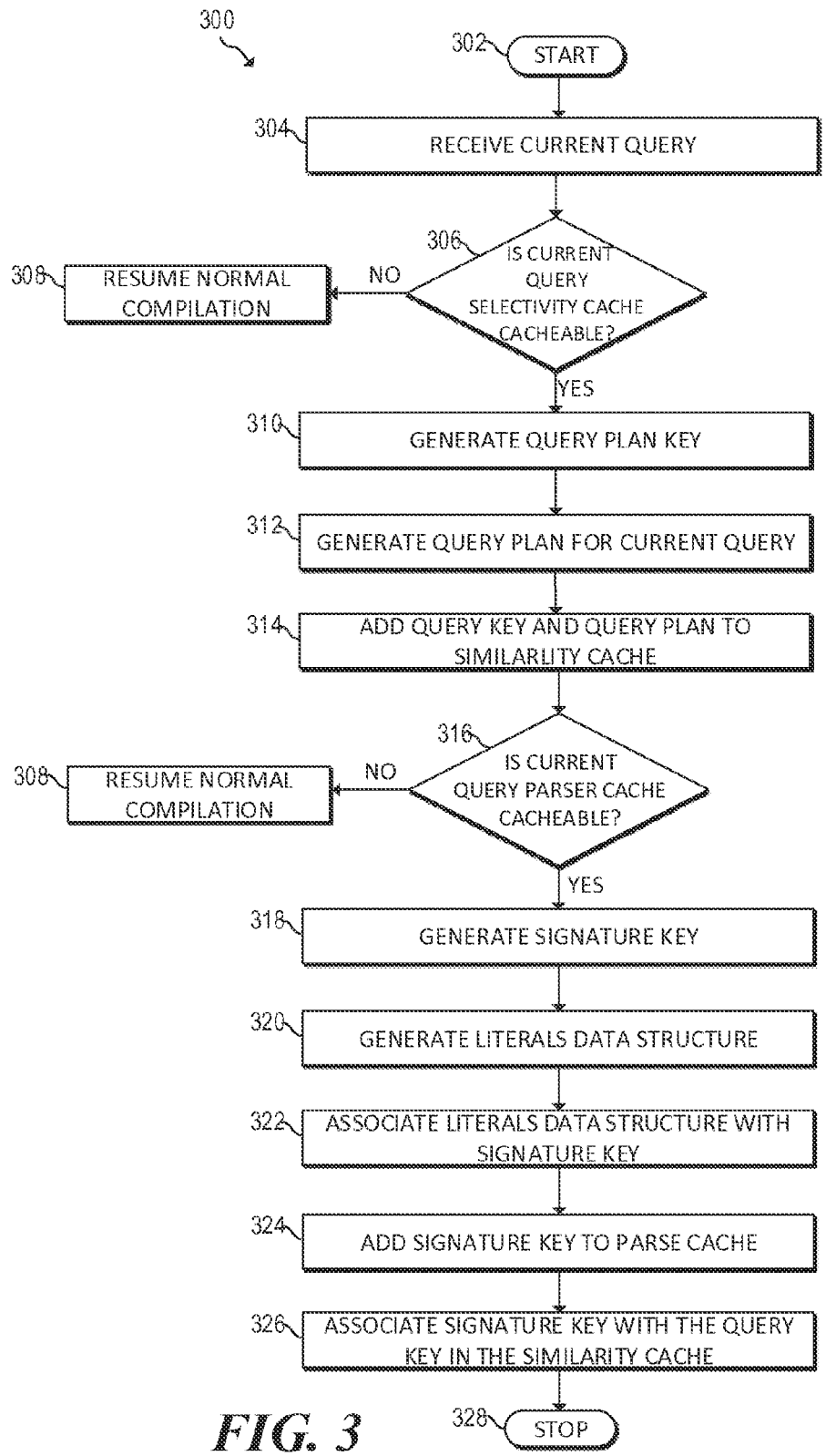
FIG. 3 is a flowchart of an example method for determining whether a query can be cached in the similarity cache and the parser cache.

FIG. 3 is a flowchart of an example method 300 for determining whether a query can be cached in the similarity cache and the parser cache and adding the query into these two caches. Method 300 may be described below as being executed or performed by a system, for example, system 110 of FIG. 1. Other suitable systems and/or computing devices may be used as well. Method 300 may be implemented in the form of executable instructions stored on at least one machine-readable storage medium of the system and executed by at least one processor of the system. Alternatively or in addition, method 300 may be implemented in the form of electronic circuitry (e.g., hardware). In alternate embodiments of the present disclosure, one or more steps of method 300 may be executed substantially concurrently. In alternate embodiments of the present disclosure, method 300 may include more or less steps than are shown in FIG. 3. In some embodiments, one or more of the steps of method 300 may, at certain times, be ongoing and/or may repeat.

As described above, if the signature key generated from a current query does not match any signature keys in the parser cache, a new cache entry may be created. Method 300 may start at step 302 and continue to step 304, where the system may receive the current query. At step 306, the method may determine if the current query is selectivity cache cacheable. The method 300 may use one or more caching techniques for creating and/or determining query keys, such as a Selectivity-based Query Caching (SQC) technique. SQC is a technique that reuses query plans when a selectivity values of each literal in the cached query and in the current query are within a predefined threshold. A compiler employing SQC forms a key during a binding stage of query execution. If the system determines that the current query is not selectivity cache cacheable (NO branch of step 306), then the method may continue to step 308, where method 300 may resume normal compilation of the query.

If the system determines that the current query is selectivity cache cacheable (YES branch of step 306), then the method may continue to 310, where the system may generate a query key. At step 312, the system may generate a query plan for the current query. At step 314, the system may add the query key and query plan to the selectivity cache.

At step 316, the system may determine if the current query is parser cache cacheable. If the system determines that the current query is not parser cache cacheable (NO branch of step 316), then the method may continue to step 308, where method 300 may resume normal compilation. If the system determines that the current query is parser cache cacheable (YES branch of step 316), then the method may continue to 318, where the system may generate a signature key. At step 320, the system may generate a literals data structure. The literals data structure may comprise a group of literals, a list of high and low boundary intervals, a parameterization indicator and a query plan key. At step 322, the system may associate the literals data structure with the signature key. At step 324, the system may add the signature key to the parser cache. At step 326, the system may associate the signature key with the query key in the similarity cache. The method may continue to step 328, where method 300 may stop.

Figure 4:
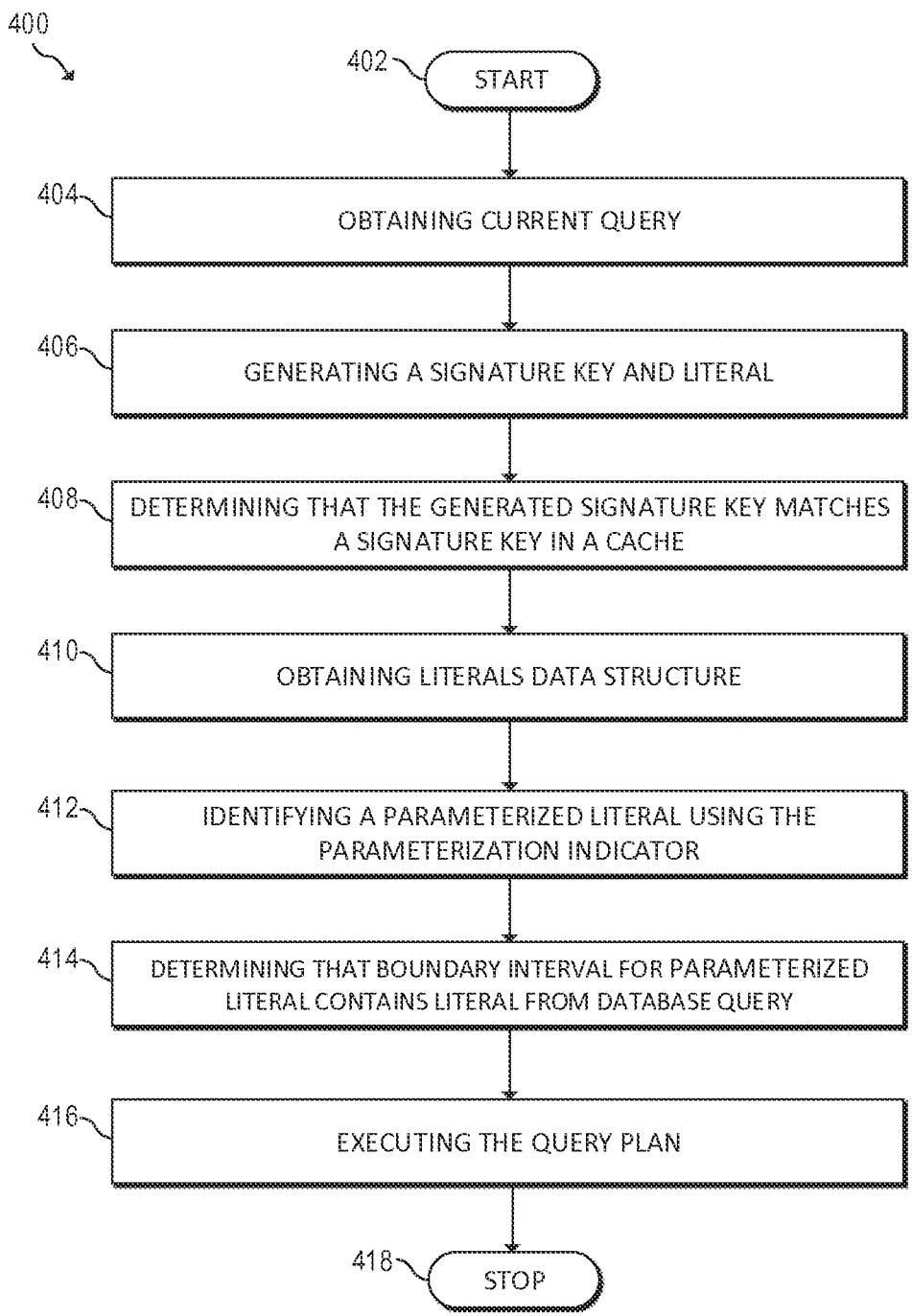
FIG. 4 is a flowchart of an example method for query plan determination.

FIG. 4 is a flowchart of an example method 400 for query plan determination. Method 400 may be described below as being executed or performed by a system, for example, system 110 of FIG. 1, system 500 of FIG. 5 or system 600 of FIG. 6. Other suitable systems and/or computing devices may be used as well. Method 400 may be implemented in the form of executable instructions stored on at least one machine-readable storage medium of the system and executed by at least one processor of the system. Alternatively or in addition, method 400 may be implemented in the form of electronic circuitry (e.g., hardware). In alternate embodiments of the present disclosure, one or more steps of method 400 may be executed substantially concurrently or in a different order than shown in FIG. 4. In alternate embodiments of the present disclosure, method 400 may include more or less steps than are shown in FIG. 4. In some embodiments, one or more of the steps of method 400 may, at certain times, be ongoing and/or may repeat.

Method 400 may start at step 402 and continue to step 404, where the system may obtain a current query. At step 406, the system may generate a signature key and a literal from the current query. The literal may further be identified as a first parameterized literal. At step 408, the system may determine that the generated signature key matches a signature key in a parser cache. At step 410, the system may obtain a literals data structure. The literals data structure may correspond to the signature key in the parser cache and comprises a group of literals, a list of high and low boundary intervals, a parameterization indicator and a query plan key. At step 412, the system may identify, using the parameterization indicator, a parameterized literal from the group of literals. At step 414, the system may determine that a high and low boundary interval for the parameterized literal contains the first literal. At step 416, the system may execute a stored query plan on the current query. Method 400 may eventually continue to step 418, where method 400 may stop.

Figure 5:
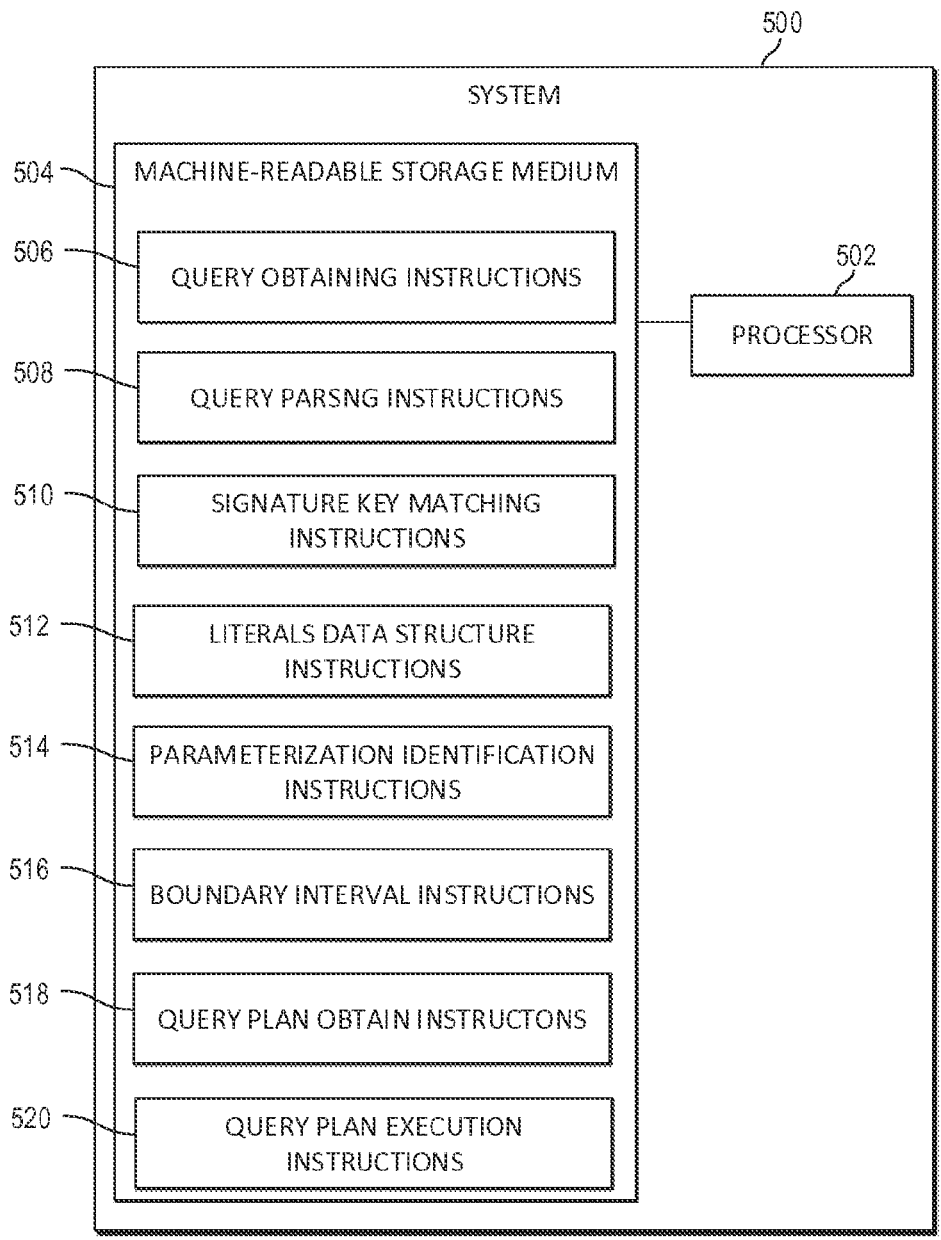
FIG. 5 is a block diagram of an example system for query plan determination.

FIG. 5 is a block diagram of an example system 500 for query plan determination. System 500 may be similar to system 110 of FIG. 1, for example. In the embodiment of FIG. 5, system 500 includes a processor 502 and a machine-readable storage medium 504. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 502 may be one or more central processing units (CPUs), microprocessors, and/or other hardware devices suitable for retrieval and execution of instructions stored in machine-readable storage medium 504. In the particular embodiment shown in FIG. 5, processor 502 may fetch, decode, and execute instructions 506, 508, 510, 512, 514, 516, 518, and 520 to perform query determination. As an alternative or in addition to retrieving and executing instructions, processor 502 may include one or more electronic circuits comprising a number of electronic components for performing the functionality of one or more of the instructions in machine-readable storage medium 504. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 504 may be any electronic, magnetic, optical, or other physical storage device that stores executable instructions. Thus, machine-readable storage medium 504 may be, for example, Random Access Memory (RAM), an Electrically-Erasable Programmable Read-Only Memory (EEPROM), a storage drive, an optical disc, and the like. Machine-readable storage medium 504 may be disposed within system 500, as shown in FIG. 5. In this situation, the executable instructions may be "installed" on the system 500. Alternatively, machine-readable storage medium 504 may be a portable, external or remote storage medium, for example, that allows system 500 to download the instructions from the portable/external/remote storage medium. In this situation, the executable instructions may be part of an "installation package". As described herein, machine-readable storage medium 504 may be encoded with executable instructions for a web technology responsive to mixtures of emotions.

Referring to FIG. 5, query obtaining instructions 506, when executed by a processor (e.g., 502), may cause system 500 to obtain a current query. The current query may contain a first parameterization function. Query parsing instructions 508, when executed by a processor (e.g., 502), may cause system 500 to parse the current query into a first literal and a first signature key. The first literal may be used in the first parameterizable function. Signature key matching instructions 510, when executed by a processor (e.g., 502), may cause system 500 to determine that the first signature key matches a second signature key. The second signature key may comprise a second sequence of tokens corresponding to the structure of a previous query. Literals data structure instructions 512, when executed by a processor (e.g., 502), may cause system 500 to obtain a literals data structure corresponding to the second signature key. The literals data structure may comprise a group of literals, a list of high and low boundary intervals, a parameterization indicator and a query plan key.

Parameterization identification instructions 514, when executed by a processor (e.g., 502), may cause system 500 to identify, using the parameterization indicator, that a parameterized literal in the group of literals is used in a second parameterizable function corresponding to the second signature key. Parameterization identification instructions 514 may also cause system 500 to identify, using the parameterization indicator, a non-parameterized literal in the group of literals. Boundary interval instructions 516, when executed by a processor (e.g., 502), may cause system 500 to determine that a high and low boundary interval for the parameterized literal contains the first literal. Query plan obtain instructions 518 when executed by a processor (e.g., 502) may cause system 500 to obtain a query plan for the second signature key using the query plan key. Query plan execution instructions 520, when executed by a processor (e.g., 502), may cause system 500 to execute a query plan on the current query.

Figure 6:
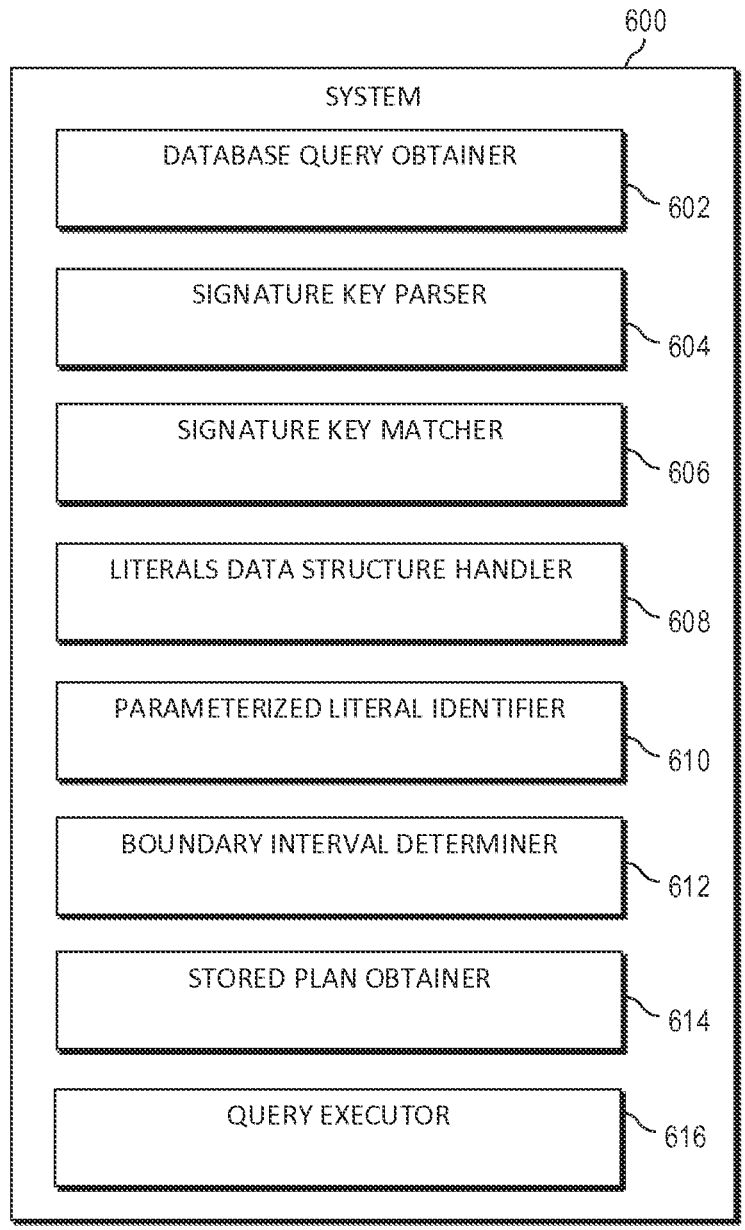
FIG. 6 is a block diagram of an example system for query plan determination.

FIG. 6 is a block diagram of an example system 600 for query plan determination. System 600 may be similar to system 110 of FIG. 1, for example. In the embodiment of FIG. 6, system 600 includes a database query obtainer 602, a signature key parser 604, a signature key matcher 606, a literals data structure handler 608, a parameterized literal identifier 610, a boundary interval determiner 612, a stored plan obtainer 614 and a query executor 616. Database query obtainer 602 may obtain a current query. Database query obtainer 602 may be implemented in the form of executable instructions stored on at least one machine-readable storage medium of system 600 and executed by at least one processor of system 600. Alternatively or in addition, database query obtainer 602 may be implemented in the form of one or more hardware devices including electronic circuitry for implementing the functionality of database query obtainer 602.

Signature key parser 604 may parse the current query into a first literal and a first signature key. The first literal may be used in a parameterizable function such as an equality predicate. Signature key parser 604 may be implemented in the form of executable instructions stored on at least one machine-readable storage medium of system 600 and executed by at least one processor of system 600. Alternatively or in addition, signature key parser 604 may be implemented in the form of one or more hardware devices including electronic circuitry for implementing the functionality of signature key parser 604.

Signature key matcher 606 may determine that the first signature key matches a second signature key stored in a hash table. Signature key matcher 606 may be implemented in the form of executable instructions stored on at least one machine-readable storage medium of system 600 and executed by at least one processor of system 600. Alternatively or in addition, signature key matcher 606 may be implemented in the form of one or more hardware devices including electronic circuitry for implementing the functionality of signature key matcher 606.

Literals data structure handler 608 may obtain a literals data structure from the hash table corresponding to the signature key. The literals data structure may include group of literals, a parameterization indicator, and a list of low intervals defined by a low bound and a high bound representing a statistical histogram for each parameterized literal in the group of literals. Literals data structure handler 608 may be implemented in the form of executable instructions stored on at least one machine-readable storage medium of system 600 and executed by at least one processor of system 600. Alternatively or in addition, literals data structure handler 608 may be implemented in the form of one or more hardware devices including electronic circuitry for implementing the functionality of literals data structure handler 608.

Parameterized literal identifier 610 may identify, using the parameterization indicator, a parameterized literal in the group of literals. The parameterized literal in the group of literals may be used in a parameterizable function corresponding to the signature key. Parameterized literal identifier 610 may be implemented in the form of executable instructions stored on at least one machine-readable storage medium of system 600 and executed by at least one processor of system 600. Alternatively or in addition, parameterized literal identifier 610 may be implemented in the form of one or more hardware devices including electronic circuitry for implementing the functionality of literals data parameterized literal identifier 610.

Boundary interval determiner 612 may determine that the first literal is contained in a range defined by the low bound and the high bound of the statistical histogram for the parameterized literal. Boundary interval determiner 612 may be implemented in the form of executable instructions stored on at least one machine-readable storage medium of system 600 and executed by at least one processor of system 600. Alternatively or in addition, boundary interval determiner 612 may be implemented in the form of one or more hardware devices including electronic circuitry for implementing the functionality of boundary interval determiner 612.

Stored plan obtainer 614 may obtain a stored query plan for the signature key. Stored plan obtainer 614 may be implemented in the form of executable instructions stored on at least one machine-readable storage medium of system 600 and executed by at least one processor of system 600. Alternatively or in addition, stored plan obtainer 614 may be implemented in the form of one or more hardware devices including electronic circuitry for implementing the functionality of stored plan obtainer 614.

Query executor 616 may execute the stored query plan on the current query. Query executor 616 may be implemented in the form of executable instructions stored on at least one machine-readable storage medium of system 600 and executed by at least one processor of system 600. Alternatively or in addition, query executor 616 may be implemented in the form of one or more hardware devices including electronic circuitry for implementing the functionality of query executor 616.

The invention claimed is:

1. A method for determining query plans using at least one processor, the method comprising:
    obtaining a current query;
    generating a first parameterized literal and a first signature key from the current query;
    determining that the first signature key matches a second signature key stored in a cache;
    obtaining a literals data structure corresponding to the second signature key, the literals data structure comprising a group of literals, a list of high and low boundary intervals, a parameterization indicator, and a query plan key;
    identifying, using the parameterization indicator, a second parameterized literal in the group of literals;
    determining that a high and low boundary interval for the second parameterized literal contains the first parameterized literal;
    obtaining a stored query plan for the second signature key using the query plan key; and
    executing, by the at least one processor, the stored query plan on the current query.

2. The method of claim 1, wherein generating the first parameterized literal and the first signature key from the current query occurs during a parsing stage of a query compilation.

3. The method of claim 1, wherein the first signature key comprises a first sequence of tokens corresponding to the structure of the current query and the second signature key comprises a second sequence of tokens corresponding to the structure of a previous query.

4. The method of claim 1 further comprising:
    parsing the current query into a first non-parameterized literal;
    identifying, using the parameterization indicator, a second non-parameterized literal in the group of literals; and
    determining that the first non-parameterized literal matches the second non-parameterized literal.

5. The method of claim 1, wherein the cache comprises a hash table including a group of signature keys and each signature key is associated with a corresponding literals data structure.

6. A system for determining query plans comprising:
    a processor that:
    obtains a current query;
    parses the current query into a first parameterized literal and a first signature key;
    determines that the first signature key matches a second signature key stored in a hash table;
    obtains a literals data structure from the hash table corresponding to the second signature key, the literals data structure comprising a group of literals, a parameterization indicator, and a statistical histogram for each parameterized literal in the group of literals, each statistical histogram comprising a list of intervals defined by a low bound and a high bound;
    identifies, using the parameterization indicator, a second parameterized literal in the group of literals;
    determines that the first parameterized literal is contained in a range defined by the low bound and the high bound of the statistical histogram for the second parameterized literal;
    obtains a stored query plan for the second signature key; and
    executes the query plan on the current query.

7. The system of claim 6, wherein the list of intervals for each statistical histogram is further defined by a row count and a unique entry count, and the processor:
    determines a first density of a first interval in the list of intervals and a second density of a second interval in the list of intervals, wherein the density is based on the row count and the unique entry count;
    determines that the first density is the same as the second density; and
    combines the first interval and the second interval.

8. The system of claim 6, wherein the processor:
    parses the current query into a first non-parameterized literal;
    identifies, using the parameterization indicator, a second non-parameterized literal in the group of literals; and determines that the first non-parameterized literal matches the second non-parameterized literal.

9. The system of claim 6 wherein the literals data structure further comprises a query plan key and the processor obtains the stored query plan for the second signature key using the query plan key.

10. The system of claim 6, wherein the processor parses the current query into a first parameterized literal and a first signature key during a parsing stage of a query compilation.

11. The system of claim 6, wherein the processor generates an equivalent class of queries, wherein each query in the equivalent class of queries contains an identical histogram interval for each parameterized literal parsed from the current query and each query in the equivalent class of queries uses the stored query plan.

12. A non-transitory machine-readable storage medium comprising instructions executable by a processor of a computing device for determining query plans, the machine-readable storage medium comprising:
- instructions to obtain a current query containing a first equality function;
- instructions to parse the current query into a first parameterized literal and a first signature key, wherein the first parameterized literal is used in the first equality function;
- instructions to determine that the first signature key matches a second signature key;
- instructions to obtain a literals data structure corresponding to the second signature key, the literals data structure comprising a group of literals, a list of high and low boundary intervals, a parameterization indicator and a query plan key;
- instructions to identify, using the parameterization indicator, that a second parameterized literal in the group of literals is used in a second equality function corresponding to the second signature key;
- instructions to determine that a high and low boundary interval for the second parameterized literal contains the first parameterized literal;
- instructions to obtain a query plan for the second signature key using the query plan key; and
- instructions to execute the query plan on the current query.

13. The non-transitory machine-readable storage medium of claim 12, further comprising:
- instructions to parse the current query into a first non-parameterized literal, wherein the first non-parameterized literal is not used in the equality function in the current query;
- identifying, using the parameterization indicator, a second non-parameterized literal in the group of literals, wherein the second non-parameterized literal is not used in the second equality function corresponding to the second signature key; and
- determining that the first non-parameterized literal matches the second non-parameterized literal.

14. The non-transitory machine-readable storage medium of claim 12, wherein the first signature key comprises a first sequence of tokens corresponding to the structure of the current query and the second signature key comprises a second sequence of tokens corresponding to the structure of a previous query.

* * * * *